United States Patent [19]

Savard et al.

[11] 4,246,111
[45] Jan. 20, 1981

[54] APPARATUS FOR BIOLOGICAL TREATMENT OF WASTE WATER

[75] Inventors: Guy Savard, Westmount; Robert G. H. Lee, Montreal; Derek Hornsey, Roxboro, all of Canada

[73] Assignee: Canadian Liquid Air Ltd/Air Liquide Canada LTEE, Montreal, Canada

[21] Appl. No.: 92,176

[22] Filed: Nov. 7, 1979

Related U.S. Application Data

[60] Division of Ser. No. 905,008, May 11, 1978, Pat. No. 4,192,740, which is a continuation-in-part of Ser. No. 730,478, Oct. 7, 1976, abandoned.

[51] Int. Cl.³ .............................................. C02F 3/26
[52] U.S. Cl. .............................. 210/96.1; 210/195.3; 210/197; 210/220; 210/521
[58] Field of Search ..................... 210/197, 198.1, 3–8, 210/14, 15, 84, 83, 44, 195.3, 96.1, 207, 208, 20, 521, 219, 194, 195.1, 256, 18, 221.1, 221.2; 261/91, 93, 121

[56] References Cited

U.S. PATENT DOCUMENTS

| | | | |
|---|---|---|---|
| 3,482,694 | 12/1969 | Rice et al. | 210/522 |
| 3,615,025 | 10/1971 | Rice et al. | 210/521 |
| 3,643,403 | 2/1972 | Speece | 261/91 |
| 3,788,476 | 1/1974 | Othmer | 210/208 |
| 3,804,255 | 4/1974 | Speece | 210/221 P |
| 3,966,598 | 6/1976 | Ettelt | 210/221 P |
| 3,983,031 | 9/1976 | Kirk | 210/220 |
| 4,000,227 | 12/1976 | Garrett | 210/219 |

*Primary Examiner*—Benoit Castel
*Attorney, Agent, or Firm*—Browdy and Neimark

[57] ABSTRACT

An apparatus is provided for treating waste water biologically and clarifying the biologically treated water; considerable economic advantage is obtained by conducting both the biological treatment and the clarification of biologically treated water in a single vessel rather than in separate vessels; it is further found possible to treat in this system water containing much higher concentrations of waste; in the process the supply of oxygen to the biological reaction zone is carefully monitored to meet the biological oxygen demand and avoid the occurrence of undissolved oxygen in the form of gas bubbles in the biological reaction zone or the clarification zone; there is further provided improvements in oxygen dissolving devices rendering them especially suitable for the two zone treatment.

9 Claims, 13 Drawing Figures

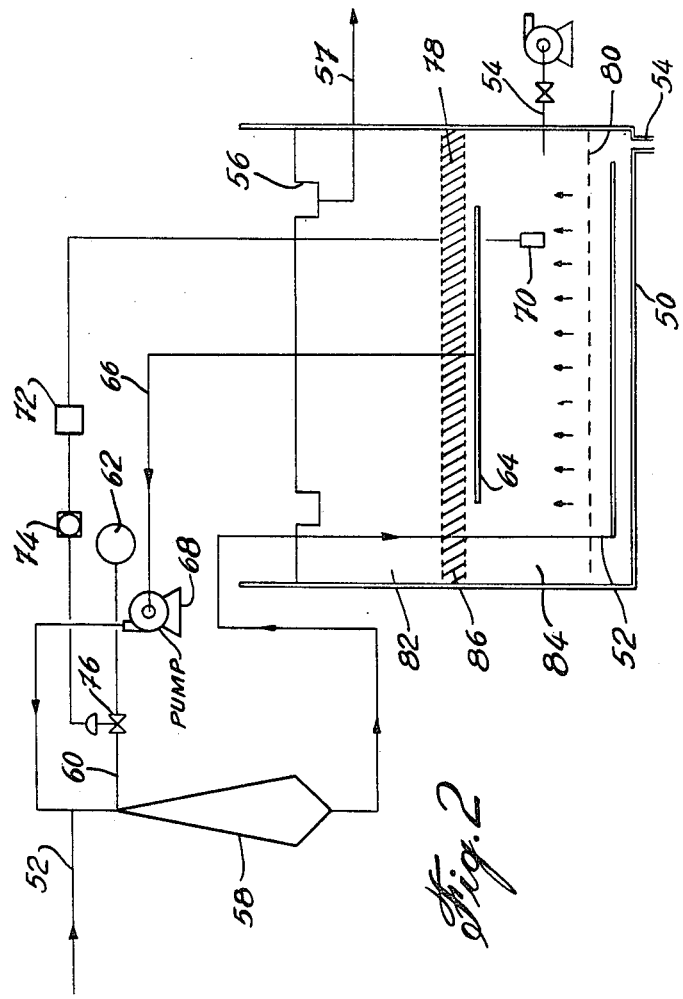

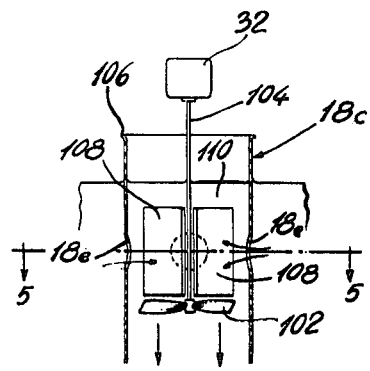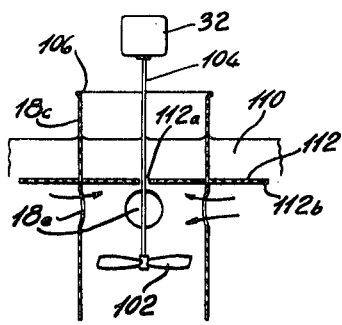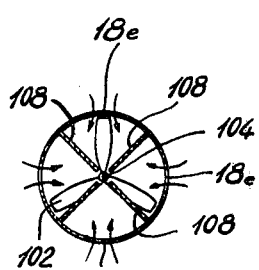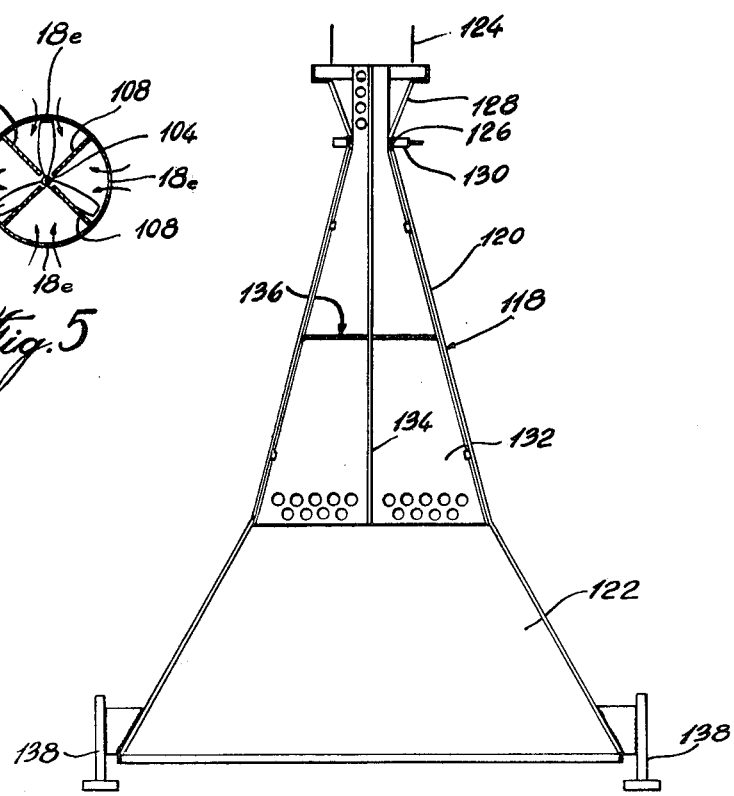

APPARATUS FOR BIOLOGICAL TREATMENT OF WASTE WATER

CROSS-REFERENCE TO RELATED APPLICATIONS

This application is a divisional of copending application Ser. No. 905,008, filed May 11, 1978, now U.S. Pat. No. 4,192,740, which is a continuation-in-part application of U.S. patent application Ser. No. 730,478 filed Oct. 7, 1976, and now abandoned.

BACKGROUND OF THE INVENTION

(A) Field of the Invention

This invention relates to the treatment of waste water having a biological oxygen demand (B.O.D.) to remove the B.O.D. More especially the invention is concerned with an apparatus which permits the employment of a single vessel for carrying out the biological reaction and the secondary clarification by settling of precipitated solids from the biological reaction; still further the invention is concerned with improvements in oxygen dissolving devices which may be employed in the apparatus to efficiently dissolve oxygen in the waste water.

(B) Description of the Prior Art

(i) Treatment of waste water

Purification and biological treatment of waste water from municipal and industrial sources prior to discharge into natural water systems conventionally comprises four basic steps carried out in four separate treatment tanks or vessels in series.

A typical treatment plant will comprise a plurality of such series of treatment tanks disposed in parallel to treat water from a common inlet duct and discharge it from a common outlet duct.

By way of example of Municipal treatment plant in Hamilton, Ontario is designed to treat waste water at a rate of 60 million gallons/day; each series of primary clarifier aeration tank and clarification tank treats 7.5 million gallons/day, and there are eight such series in parallel. In the Hamilton plant each aeration tank is 360 ft. long, 60 ft. wide and 15.5 ft. deep, and each clarifier is 120 ft. square and 10 ft. deep; thus each aeration tank has an exposed surface area of 21,600 sq. ft., and each clarifier has an exposed surface area of 14,400 sq. ft.

In such conventional treatment processes the waste water is treated initially in a degritting tank in which the heavy solid particles are permitted to settle out. The water passes from the degritting tank to a primary clarifier which comprises a tank which holds the waste water for a time to permit suspended solid particles to settle out and wherein floating solids and oils and grease are skimmed off. The liquid from the primary clarifier passes to an aeration tank which contains microorganisms for converting dissolved matter in the liquid into insoluble matter, air or oxygen is introduced under agitation into the tank to meet the oxygen requirement of the microorganisms. From the aeration tank liquid containing suspended solids and dissolved matter is passed to a secondary clarifier; clear liquid overflows from the secondary clarifier and solids are removed from a lower portion of the clarifier. A portion of the liquid containing sludge in the secondary clarifier is continuously recycled to the aeration tank for further biological treatment, and the excess is wasted.

Various proposals have been made to modify the conventional treatment apparatus to overcome different disadvantages and to improve the efficiency, for example the modifications described in U.S. Pat. No. 3,476,682, Albersmeyer and U.S. Pat. No. 3,983,031, Kirk.

It has been recognized that as the amount of suspended solids in the liquid entering the secondary clarifier increases, the solids loading becomes the critical factor in design criteria governing the size of the secondary clarifier; and the size of the secondary clarifier increases relative to the size of the aeration tank. Consequently the capital cost of the secondary clarifier represents a major portion of the overall cost. This was discussed in a paper entitled Solids Thickening Limitation and Remedy in Commercial Oxygen Activated Sludge presented by R. E. Speece and Michael J. Humenick of the University of Texas at Austin at the 45th Annual Convention of the Water Pollution Control Federation, Oct. 9, 1972, in Atlanta, Ga.

It was further suggested by Speece and Humenick in the aforementioned paper that it might be possible to meet the problem of secondary clarifier size by reducing the amount of solids being transferred from the aeration tank to the secondary clarifier by employing some solids separation within the aeration tank. Speece and Humenick theorized that the secondary clarifier could perhaps be omitted if a solids separation could be achieved in the aeration tank which reduced the overflow suspended solids down to a level permissible in the final effluent. Speece and Humenick were primarily concerned with an oxygen dissolving device which they called a Downflow Bubble Contact Aerator (DBCA), which they developed, and in particular were concerned with its constructional parameters.

The oxygen dissolving device of Speece is described in U.S. Pat. No. 3,643,403, and Speece has also obtained U.S. Pat. No. 3,804,255 which describes the use of an oxygen contact device in the treatment of waste water.

Nevertheless the disclosures of Speece and Humenick and the U.S. patents of Speece fail to recognize that control of the oxygen added is essential to successful treatment of the waste water in a single vessel.

(ii) Oxygen Dissolving Devices

Gas dissolving devices are known and their function is to introduce and dissolve a gas in a liquid. One such device is described by Speece in the aforementioned U.S. Pat. No. 3,643,403, which is especially concerned with dissolving oxygen in water to aerate the water and increase the dissolved oxygen concentration. The Speece device comprises an upright conical housing through which water is passed downwardly and oxygen is continuously injected into the downwardly flowing water through a bubble disperser located in an upper portion of the conical housing adjacent the water inlet.

The inlet velocity of the water entering the conical housing is designed to exceed the upward buoyant velocity of the gas bubbles. The outlet velocity from the bottom of the skirt of the housing is designed to be less than the upward buoyant velocity of the gas bubbles so that between the inlet and outlet a cloud of bubbles of changing size is held in suspension under highly turbulent conditions.

In the lower portion of the conical housing an equilibrium position is established where the down flow velocity of the water equals the buoyancy of the oxygen bubbles and an oxygen bubble zone is established for prolonged contact with the downwardly flowing water. Speece indicates that eventually the bubbles are displaced from the outlet end of the conical housing by virtue of the continuous injection of bubbles at the bubble disperser causing "crowding" of the bubbles at the lower outlet end.

In U.S. Pat. No. 3,804,255 Speece describes a modification in his oxygen dissolving device in which he includes a bubble harvester in the bubble zone to collect the bubbles, including bubble of waste gases such as nitrogen and carbon dioxide which are continuously stripped from the water, the collected bubbles being vented to atmosphere through a vent tube. Speece indicates that the objective of this is to confine turbulence to the interior of the conical housing of the oxygen dissolving device.

Thus in U.S. Pat. No. 3,804,255 Speece seeks to prevent turbulence externally of the oxygen dissolving device, however, Speece did not recognize that the presence of undissolved oxygen in the biological reaction zone would disrupt the formation of the separate clarified zone. Indeed Speece particularly indicates that the solid separation capability in the waste treatment process and the stability of the interface between the clarified supernatant and the sludge, is preserved by confining turbulence to the interior of the cone member.

Clearly Speece did not recognize the significance of controlling the supply of oxygen introduced into the system so as to meet the biological oxygen demand of the microorganisms and avoid undissolved oxygen in the biological reaction zone. Indeed it is clear that Speece did not contemplate controlling the oxygen supply at all since he included a vent means to avoid build up of excess oxygen and other gases in the bubble zone.

Speece sought to eliminate turbulence in the liquid outside the cone member which he found disrupted the formation of the clarified supernatant layer by agitation of the liquid outside the cone member.

It should be recognized, however, that Speece does not eliminate the presence of gas bubbles outside the cone member. This is because the pressure within the cone member is significantly higher than the pressure outside the cone member. Consequently when oxygenated liquid emerges from the outlet in the cone member of Speece, the release in pressure experienced by the liquid results in evolution of some of the oxygen (dissolved under pressure) with the result that bubbles of oxygen are formed.

The present inventors discovered that the released oxygen, in the form of gas bubbles disturbed the efficiency of the clarifying process by carrying suspended solid particles into the clarification zone; and this was the case even when the emergence of the gas bubbles from solution outside the cone member, did not result in any significant change in the turbulence characteristics of the liquid outside the cone member. In other words, in the sense of Speece, there was substantially no turbulence outside the cone member, but efficient clarification was not obtained because of the bubbles emerging from solution.

An object of this invention is to provide an apparatus for treating waste water biologically in which the biological reaction and secondary clarification of biologically treated water are conducted in a single vessel, thereby permitting considerable economy in plant design.

It is a further object of this invention to provide an apparatus for treating waste water which permits the successful treatment of waste water containing a much higher concentration of waste matter than the conventional process employing a separate aeration tank and secondary clarifier.

It is a still further object of this invention to provide an apparatus for treating waste water in which primary clarification, the biological reaction and secondary clarification are all conducted in a single vessel.

It is yet another object of the invention to provide an apparatus which provides significant economies in size over prior apparatus conventionally employed in which the several stages of the treatment are conducted in separate vessels; and which permits a much higher treatment capacity; and which in addition permits the treatment of waste water containing higher concentrations of waste matter than existing apparatus.

It is yet another object of the invention to provide improvements in oxygen dissolving devices which may be employed in the apparatus of the invention for the treatment of waste water.

SUMMARY OF THE INVENTION

Treatment of Waste Water

The present inventors have discovered that by controlling the supply of oxygen into the biological reaction zone, not merely to avoid undissolved oxygen within the reaction zone, but more precisely so as to meet the biological oxygen demand of the waste liquid, that emergence of oxygen from solution, is avoided and efficient clarification of the liquid, on a continuous basis, is obtained. In this manner stable clarification and biological reaction zones are maintained.

According to the invention there is provided an apparatus for treating waste water containing biodegradeable waste to provide a clarified liquid effluent and a disposable sludge, in which waste water is continuously passed through a treating enclosure open to the atmosphere containing waste-degrading microorganisms, to which oxygen is added to sustain the microorganisms and from which the clarified effluent is continuously overflowed and from which excess sludge and gases are removed, comprising, initially establishing (a) in a lower part of the enclosure a reaction zone containing mixed liquor and in which a biological reaction to degrade the waste is conducted, (b) in an upper part of the enclosure a clarification zone in which clarified liquor rises and overflows, and (c) between the reaction and clarification zones a transition zone in which the liquid of the mixed liquor rises and the solids settle, and continuously, providing a recycle stream made up of raw waste water to be treated combined with mixed liquor drawn from the reaction zone and recycling the stream to the reaction zone, conducting the waste water into the recycle stream at a variable rate within a range related to the depth and surface area of the enclosure to provide a residence time within the reaction zone effective for the biodegradation of the waste and for the formation and settling of biological floc, adding oxygen to said recycle stream at a rate to provide an oxygen concentration within a controlled range below the saturation level of oxygen in the liquid effective to meet the oxygen demand of the organisms and maintaining it in contact with the liquid in a contact zone of said stream for a time and under a pressure such that the oxygen is dissolved in the liquid, controlling the overall flow rate of said recycle stream to a substantially constant rate several times that of the incoming waste water effective to provide (d) for dissolving the oxygen which is added to the recycle stream, (e) an amount of dilution of the recycle stream entering the reaction zone effective to prevent the oxygen coming out of solution at an upper part of the reaction zone, distributing the flow of said recycle stream entering the reaction zone, (f) to provide controlled agitation effective to keep the solids dispersed, (g) and to provide at an intermediate level of the enclosure, an upward velocity of the mixed liquor less than the settling rate of the solids, whereby there is maintained in the enclosure said separate reaction and clarification zones intervened by said transition zone, continuously monitoring the concentration of dissolved oxygen in the reaction zone to determine variations thereof resulting from variations in the flow rate and concentration therein of waste, periodically adjusting the rate of addition of the oxygen to the recycle stream in response to variations in the oxygen concentration in the reaction zone to maintain said concentration within said controlled range and at a level where there is substantially avoided effervescence that would lead to gas bubbles rising into the clarification zone, continuously withdrawing said effluent from the clarification zone to keep pace with the influent waste water, and continually removing excess sludge from the reaction zone and carbon dioxide from the mixed liquor.

Suitably the oxygen is dissolved in the recycle stream in an oxygen dissolving device, which comprises a housing defining a contact zone for the recycle stream and injected oxygen and including means for injecting oxygen into the recycle stream contained within the housing. Thus the oxygenated recycle stream is circulated through the biological reaction zone and through the device for a time effective for completion of the biological reaction in the biological reaction zone and at a flow rate effective to maintain solids in the mixed liquor in suspension, and an upwardly flowing clarified liquid is continuously separated from the oxygenated liquid in the biological reaction zone to form the zone of clarified liquid above the biological reaction zone.

The rate of flow of the recycle stream in the biological reaction zone is at a flow rate several times greater than the flow rate of the upwardly flowing clarified liquid and the flow rate of the upwardly flowing clarified liquid is such that the rate of settling of suspended solids is greater than the upward flow of liquid to permit the clarification. The supply of oxygen is controlled to meet the biological oxygen demand of the microorganisms and avoid undissolved oxygen in the biological reaction zone such that conveyance of suspended solids, by bubbles of oxygen, into said zone of clarified liquid is avoided.

The oxygen supplied to the biological reaction zone is controlled by careful monitoring so that the oxygen requirement of the microorganism for efficient metabolism is met. At the same time, and most importantly, the supply of oxygen is carefully controlled to ensure that there is no undissolved oxygen in the biological zone or the clarification zone. It is found that if undissolved oxygen is present in the biological reaction zone then the undissolved oxygen in the form of small bubbles disturbs the secondary clarification because the small bubbles rise through the upwardly flowing clarified liquid and convey solid particles of waste material with them so that satisfactory clarification is not achieved; further the oxygen bubbles and the solid particles of waste material conveyed by the oxygen bubbles tend to pick up active material in the biological reaction zone comprising both microorganisms and waste material which has not been biologically treated and this also results in unsatisfactory secondary clarification.

According to another aspect of the invention there is provided an apparatus for treating waste water, comprising, a container for enclosing a body of fluid material beneath an upper surface and open to the atmosphere, means forming a passage for a combined stream of waste water and liquid drawn from a lower reaction zone of the container, means for conducting influent waste water to said passage, means for drawing mixed liquor from said lower zone and feeding it to said passage, means controlled by an oxygen control valve for introducing oxygen in finely divided form into a contact zone in said passage, a probe for sensing the concentration of dissolved oxygen in said reaction zone, a dissolved oxygen analyzer and controller responsive to the probe for operating said control valve, an overflow from the upper zone in the vessel to allow overflow to keep pace with the feed of waste water, means for removing sludge from the bottom of the vessel, and means to provide controlled agitation of the fluid contents only in a predetermined lower zone of the vessel to keep the solids in suspension and to maintain an upper zone quiescent and an intermediate zone in which the solids settle and the liquid rises.

The apparatus of the invention comprises a single vessel and includes one or more oxygen dissolving devices adapted to dissolve oxygen in the recycle stream. The device may be located within or externally of the vessel.

The means for controlling the recycle stream is effective to continuously circulate the oxygenated stream through the biological reaction zone and through the oxygen dissolving device for a time effective for completion of the biological reaction in the biological reaction zone and at flow rate effective to maintain solids in the reaction zone in suspension; further the recycle stream is controlled so as to produce a flow rate in the recycle stream considerably greater than the flow rate of upwardly flowing clarified liquid, and a flow rate of upwardly flowing clarified liquid such that the rate of settling of suspended solids is greater than the upward flow of liquid to permit the clarification thereof. The means for adjusting the supply of oxygen to said oxygen dissolving device responsive to the monitoring means is effective to control the oxygen supply to meet the biological oxygen demand and avoid undissolved oxygen in the biological reaction zone.

Effectively in the apparatus of the invention the biological treatment of the waste water and the clarification of the biologically treated water, known as secondary clarification, are conducted in a single vessel having a lower biological reaction zone and an upper clarification zone with an intervening transition zone. Although physical separation of the two zones is not absolutely necessary it is found to be convenient to employ flow distributing baffles between the zones since this improves the separation of suspended solids from the upwardly flowing clarified liquid.

The two zones are effectively produced by appropriate hydraulic design; in any hydraulic system in which water in a vessel is subject to agitation there will be a zone in which the flow rate of the water resulting from the agitation is high and more remote zones in which the flow rate is low. The present invention utilizes this phenomenon to advantage, the vessel being constructed such that the biological reaction zone is the zone in which the flow rate of water is high and the clarification zone is the zone in which the flow rate of water is low.

The flow rate of water in the clarification zone is equal to the rate of flow of the influent into the vessel, the flow rate of water in the recycle stream being 10 to 100, preferably 25 to 50 and more preferably 35 to 45 times the rate of flow of the influent.

The significantly higher rate of flow in the recycle stream relative to the rate of flow in the clarification zone, is necessary both to produce the required hydraulic system permitting efficient separation of the clarified liquid, and to maintain the solids precipitated from the water in the biological reaction zone in suspension; the solids must remain in suspension since settling of the solids and accumulation in the bottom of the vessel will eventually disturb the hydraulic system.

As the amount of precipitated solids increases, a portion of the solids and are periodically removed as a sludge from the bottom of the vessel. By continually removing settled solids and continuously removing clarified effluent, it is found that a stable system is established for the continuous treatment of waste water.

The flow rates and the design of the waste treatment system is such that the time which the waste water spends in the oxygen dissolving device is very low in comparison with the time spent in the biological reaction zone. For each circulation of waste water through the oxygen dissolving device and biological reaction zone the residence time of the waste wate in the oxygen dissolving device is typically from 5 to 100 seconds. The total average time that waste water spends in the biological reaction zone is about 0.5 to 5 hours, preferably about 1 to 3 and more preferably about 2 hours.

The circulation of the recycle stream through the oxygen dissolving device and the biological reaction zone is controlled so as to provide for dissolving of the injected oxygen, the feed of which may vary, and to maintain the oxygen in solution as the recycle stream enters the biological reaction zone.

To this end, it is found to be appropriate to control the circulation of the recycle stream such that the time for one complete circulation of the volume of the biological reaction zone is 1 to 60 minutes.

The flow rate of the influent will vary as will the concentration and quality of the biodegradeable waste, and this means that the oxygen requirement will vary in respone to these changes. In the present invention the parameters of the vessel are selected so that the vessel can accommodate changes in the flow rate of the influent. Further, by monitoring the dissolved oxygen concentration and controlling the feed of oxygen in responese thereto in accordance with the invention, account is taken of the variations in the oxygen requirement of the microorganisms in response to variations in the flow rate of the influent and the content and quality of the waste material therein. There is thereby obtained an efficient treatment of the waste water.

In this respect a treatment vessel within the invention can be successfully employed to treat 300 to 600, typically 400 gallons per sq. foot per day. foot per day of waste water on a continuous basis.

Further it was not to be expected that the process and apparatus of the invention employing a single vessel would permit the effective continuous treatment of a water having a higher content of waste material than the conventional system in which aeration and secondary clarification are conducted in completely separate vessels.

It will be understood that in the clarification zone the rate of settling of the solids must be greater than the rate of upward flow of liquid to achieve efficient clarification.

Accordingly, in constructing the vessel for carrying out the process of the invention various factors must be taken into consideration which will depend on the conditions of the particular case, but which are, however, well within the scope of the competent workman in this field of technology.

As has been described previously it is essential that the oxygen supplied to the biological reaction zone be carefully controlled to ensure that there is no undissolved oxygen in the form of gas bubbles. For similar reasons it is appropriate to employ commerical oxygen free of other gases. Air would not be suitable as the source of oxygen in view of the high content of nitrogen; nitrogen is much less soluble in water than oxygen and employment of air as the source of oxygen would result in a large number of nitrogen bubbles in the biological reaction zone which would rise upwardly conveying solids into the clarification zone. It might be possible to employ an oxygen enriched air having a high oxygen content as the oxygen source if this did not introduce a significant amount of undissolved nitrogen into the system.

The oxygen is injected into the recycle stream so as to maintain the oxygen concentration in the biological reaction zone in a selected range. This selected range is determined both by the requirement of the microorganisms in biodegrading the waste solids in the reaction zone, and by the necessity of avoiding undissolved oxygen which would disrupt the clarification. The saturation value for oxygen in water is about 43 mg/l but for air is about 9.2 mg/l, at 20° C. The saturation values in waste water are typically 80 to 90% of the values in water.

Since the vessel is most conveniently operated open to the atmosphere, the atmosphere above the clarification zone is air. Consequently the selected range for the oxygen concentration is determined on the basis of the saturation value for air in waste water.

The saturation values of gases in water are dependent on the temperature of the water, and the process of the invention will generally be carried out with waste water at a temperature of from 7° C. to 40° C., and more usually from 10 to 30° C.

Within these operating temperature ranges, the dissolved oxygen concentration in the reaction zone is suitably selected within the range of 1 to 5 mg/l and preferably 2 to 3 mg/l. A lower limit for effective operation would be of the order of 0.1 mg/l, but concentrations of this order, while within the scope of the invention, are less preferred. The upper limit is the saturation value for oxygen in the waste water, however, it is inappropriate to employ this upper limit when the vessel is open to the atmosphere. The upper limit for operation in a vessel open to the air is more appropriately the saturation value for air in the waste water, although it is probable that the invention could be carried out while maintaining a dissolved oxygen concentration of 10 to 15 mg/l; this, however, is less preferred.

The oxygen concentration may well be higher in the recycle stream in the oxygen dissolving device than in the biological reaction zone, the recycle stream being diluted on entering the biological reaction zone. However, by controlling the oxygen concentration in the biological reaction zone relative to the saturation value for air, the oxygen concentration in the oxygen dissolving device will be below the saturation value for air.

In carrying out the invention, gases such as nitrogen are formed so that the system moves towards a nitrogen contaminated oxygen rather than pure oxygen. Although the relative proportions of nitrogen and oxygen will not approach that in air, it is safer to employ the saturation value for air, rather than that for oxygen in selecting the oxygen concentration so as to avoid undissolved bubbles of oxygen and nitrogen.

Further, in a vessel open to the atmosphere, an equilibrium is established at the interface of the air and the exposed surface of the water. If the oxygen concentration in the water was higher than the saturation value for air, dissolved oxygen would come out of solution at the interface, as bubbles, conveying solids and forming a scum on the clarified liquid, which would be inacceptable.

It is thus found to be preferable to maintain the dissolved oxygen concentration well below the saturation value for air in the waste water, so as to minimize the chance of the saturation value being inadvertently exceeded such that bubbles of oxygen would emerge from solution.

Furthermore, the rate of dissolving of the oxygen in the waste water increases and hence the efficiency increases, as the dissolved oxygen concentration moves away from the saturation value, where the system is at equilibrium.

Thus in carrying out the process of the invention the dissolved oxygen concentration, in the biological reaction zone, in continuously monitored, and a signal established in response to the monitoring indicative of the dissolved oxygen concentration. The feed of oxygen to the reaction zone is then regulated in response to the signal so as to maintain a pre-established dissolved oxygen concentration in the reaction zone of at least 0.1 mg/l and less than the saturation value of air in the waste water, effective to meet the biological oxygen demand per unit time, and avoid undissolved oxygen in the biological reaction zone such that conveyance of suspended solids, by bubbles of oxygen, into the clarification zone is avoided.

The oxygen probe or sensor of the oxygen monitoring system is disposed in the biological reaction zone. A suitable probe comprises a polargraphic cell encased in a membrane of a chemically resistant polymer which is permeable to oxygen. A part of the dissolved oxygen in the reaction zone proportioned to the partial pressure, diffuses through the membranes into the cell body and is reduced at the cathode surface. This causes a current flow proportional to the amount of oxygen in the biological reaction zone. Such probes are sufficiently sensitive that variations of 0.1 ppm in the oxygen concentration are easily detected.

The oxygen is suitably introduced into the recycle stream in finely divided form to ensure efficient dissolving of the oxygen in the waste water. The oxygen is injected into the recycle stream in the form of fine bubbles. The pressure of the oxygen in the recycle stream may suitably vary from 1 to 60 psig above atmospheric pressure.

It is also found to be highly expedient to include in the vessel of the invention a flow distributor in a lower part of the biological reaction zone but at an elevated position with respect to the level of introduction of oxygenated mixed liquor to the biological reaction zone. Such a flow distributor suitably comprises a planar element spaced apart from the bottom of the vessel and extending from wall to wall of the vessel and having a plurality of passages therethrough for passage of the liquid and solids therein into the biological reaction zone; such a flow distributor serves to direct the flow upwardly and to discourage the setting up of side currents in the upward flow of liquid which might disturb the clarification zone.

Suitably the passages may be of circular cross-section, although they may also be eliptical, rectangular or square, having an area of from 0.8 to about 28 sq. ins.; preferably about 2 to about 10 sq. ins.; the area of the flow distributor occupied by the passage being from about 20 to about 80% of the total area, preferably 30 to 70%. It will be recognized that the passages must be sufficiently large to permit passage of recirculated solids in the liquid and that if the passages are too small in cross-sectional area that clogging may occur and this will interrupt the continuous treatment.

Under steady conditions the solids content in the system increases slowly. In order to keep the concentration of these solids constant, a small portion is pumped out at frequent intervals. The solids may be pumped out on a daily basis for a period of 30 minutes to 24 hours, however, typically they are pumped out for a single 4 hour period each day. The solids are pumped out at a rate daily which is about 1.0 to 10%, preferably about 4% of the influent flow per day. In a typical operation where the influent flow is about 60,000 gallons/day, the solids are suitably pumped out from the biological reaction zone at a rate of 10 gals/min for 4 hours which represents a rate of about 4% of the influent flow per day.

The parameters of the vessel must be selected to maintain a relationship between the volume of water treated per unit of time and the horizontal area surfacing to the atmosphere so as to permit the establishment of the stable clarification and biological reaction zones with the intermediate transition zone and provide a residence time within the biological reaction zone effective for the biodegradation of the waste and for the formation and settling of biological floc.

A typical treatment vessel must treat 300 to 1000 U.S. gallons per sq. ft. per day and in such a vessel the clarification zone typically has a depth of 5 to 15 feet and preferably about 10 feet; the transition zone depth is typically 1 to 5 ft., and the biological reaction zone typically has a depth of 5 to 13 feet, and preferably about 10 feet.

It is also within the scope of the invention to carry out the primary clarification of waste water in the same vessel as the biological treatment and secondary clarification. This can suitably be achieved by incorporating skimmers in the vessel effective to skim floating solids and oils from the upper surface of the biological reaction zone as well as a conveyor device in the bottom of the vessel to collect and remove heavy solids which settle rather than remaining in suspension.

A particular advantage of the apparatus of the present invention is that it permits a much higher treatment capacity per unit surface area of treatment tank, than existing installations.

In the case of the Hamilton treatment plant described previously, the separate aeration tank and clarifier in each series can be converted to two single treatment tanks in parallel, according to the teachings of the present invention and in this way the treatment capacity (i.e. volume of water treated per unit time) of an existing installation can be increased by from 50% to more than 100%. Thus in the example of the Hamilton plant it can be shown that the treatment capacity of 7.5 million gallons/day can be increased to 11 to 19 million gallons/day by modifying the existing two-tank series to provide two single treatment tanks in parallel.

If the tanks are modified to the embodiment in which all three treatments (primary clarification, biological reaction and secondary clarification) are carried out in the same vessel, then the primary clarification tanks can also be modified to provide treatment vessels of the invention. In this case each series of three tanks in the existing installation can be converted to three single treatment tanks in parallel to provide a treatment capacity which is shown to be more than three times the capacity of the single series of three tanks.

It will thus be evident that the apparatus of the invention, which by careful control of the added oxygen permit treatment on a continuous basis, without interruption, provide significant advantages especially in that they permit a significant increase in the treatment capacity of an existing plant and the construction of new plants of generally smaller size for a given treatment capacity.

Oxygen Dissolving Device

In this specification the expression "oxygen dissolving device", or "oxygen contact device" refers to any device which can be employed to contact oxygen and waste water of the recycle stream and dissolve the oxygen in the water, and which comprises a housing through which the waste water flows, and within the confines of which, the oxygen is contacted with the recycle stream and dissolved therein.

An especially preferred class of oxygen dissolving devices is the class generally illustrated in U.S. Pat. No. 3,643,403 which comprises a flow confining chamber having an upper inlet and a lower outlet through which waste water may be impelled downwardly with a decreasing velocity from a maximum at the inlet end to a minimum at the outlet end. As described by Speece the flow confining chamber comprises a downwardly diverging funnel or generally conical housing, having a vertically disposed intake tube at its upper end and an impeller mounted in the intake tube to direct the flow downwardly. The device further includes means for introducing oxygen to the funnel portion in the form of a bubble disperser. This device can be located internally or externally of the treatment tank.

As indicated previously, the residence time of the waste water in the oxygen dissolving device for each circulation will generally be from 5 to 100 seconds. In the aforementioned device comprising a generally conical housing, the residence time is preferably from 10 to 30, more preferably about 15 seconds.

The pressure of the oxygen in the conical housing is preferably about 3 to 7 psig above atmospheric pressure.

Another preferred oxygen dissolving device, particularly for location outside the treatment tank comprises a generally vertically disposed cylindrical tube having a vertically disposed partition wall separating it into an upstream side and a downstream side, the partition wall terminating above the bottom of the tube to provide a clearance for flow of waste water. Waste water is introduced at the upstream side and flows downwardly in the tube, under the lower edge of the partition wall and upwardly through the downstream side, and oxygen is introduced into the waste water in the upstream side where it is entrained in the downwardly moving water.

The parameters of the tube are such that a long path is provided for contact between the recycle stream and the oxygen. A typical tube may have a vertical height of 100 to 150 feet; the pressure increases as the oxygen bubbles and recycle stream descend the downflow portion of the tube and this increases the rate of dissolving of the oxygen. When the recycle stream ascends the upflow portion of the tube the pressure decreases, but as long as the oxygen content is below the saturation value there will be substantially no tendency for the oxygen to come out of solution.

In the tubular oxygen dissolving device the residence time of the waste water in the device for each circulation will preferably be from 30 to 100, more preferably 40 to 60 seconds. In a typical embodiment the recycle stream may spend about 20 seconds in the downstream side and 20 seconds in the upstream side.

The pressure of the oxygen gas introduced to the tubular device is preferably about 3 to 60 psig above atmospheric pressure.

The vertically disposed tube is suitably embedded in the earth as is the treatment tank.

In an especially preferred embodiment it is found to be convenient to employ a plurality of such tubes so as to increase the efficiency in dissolving the oxygen.

The present invention provides improvements in such oxygen contacting devices which improve the control of oxygen dissolving and increase the efficiency and rate at which oxygen is dissolved.

An important characteristic of the invention is that the oxygen dissolving device or the oxygen contact zone be effective to efficiently dissolve oxygen in the waste water before the waste water enters the reaction zone; undissolved oxygen bubbles should not enter the reaction zone from the oxygen contact zone.

In one embodiment the invention provides improvements in oxygen contacting devices which employ an impeller which produces a spiral flow in the downwardly moving liquid, which spiral flow enlarges downwardly because of the shape of the flow confining chamber. This spiral flow produces a vortex in the liquid in the upper intake tube which sucks or draws in air from the atmosphere above the vessel in which the oxygen contacting device is located. The major component of air is nitrogen and the nitrogen mixes with the oxygen and dilutes it and this reduces the rate at which oxygen is dissolved into the liquid. Furthermore when the oxygen dissolving device is employed in the two zone waste water treatment system of the invention, the presence of undissolved nitrogen in the biological reaction zone disturbs the clarification and the maintenance of the separate clarification and biological reaction zones in the same manner as does the presence of undissolved oxygen. This is clearly undesirable in the process and apparatus of the invention in which the injection of oxygen is to be carefully monitored and controlled to meet the biological oxygen demand and avoid the presence of undissolved oxygen in the biological reaction zone. At the same time the uncontrolled introduction of oxygen in the air at the intake tube may disturb the monitoring and control of the injected oxygen and result in undissolved oxygen in the biological reaction zone, which, as described, disturbs the clarification and the establishment of the two zones.

Thus in one embodiment there is provided an oxygen dissolving device of the general class described which is to be immersed in an open body of liquid below an atmosphere of air and which includes an impeller which directs liquid downwardly with a spiral flow, for example an axial pump, wherein the improvement comprises means disposed above the impeller effective to prevent sucking in of air from the upper atmosphere into the downwardly moving liquid.

According to the invention there is provided a device for dissolving a first gas in a body of liquid, adapted to be immersed in an open body of the liquid beneath an atmosphere of a second gas, comprising a flow confining chamber having an inlet and an outlet end through which a downflow of liquid is conducted with a decreasing velocity from a maximum velocity at the inlet end to a minimum velocity at the outlet end, an intake tube at said inlet end having at least one inlet port in the tube wall for said liquid, an impeller mounted in said intake tube, below said at least one inlet port, adapted to direct said liquid downwardly through said flow confining chamber in an enlarging spiral flow, means for injecting bubbles of said first gas into the downwardly flowing liquid and means in said intake tube disposed upstream of the impeller effective to prevent sucking in of said second gas into the liquid.

In an especially preferred aspect the means upstream of the impeller in the intake tube comprises a plurality of radially disposed vanes extending inwardly from the wall of the intake tube, each vane extending along the wall of the intake tube upstream and downstream of the inlet ports and terminating just upstream of the impeller.

In general it is preferred to employ four symmetrically disposed vanes, however, three or even two vanes can also be employed. Of course, more than four vanes can be employed, and the maximum number which can be employed will be dictated by their dimensions and the volume of the intake tube.

The vanes are suitably disposed radially, however, they may also be inclined towards the direction of the spiral flow. The vanes prevent the formation of a vortex by the spiral flow adjacent the upper atmosphere, which vortex would suck in gas from the atmosphere. The vanes should not be inclined away from the direction of spiral flow since this would promote the establishment of the vortex.

The vanes have been conveniently employed in a gas dissolving device in which the impeller has a relatively low speed of about 240 rpm.

When an impeller having a higher speed, of the order of 1700 rpm, is to be employed it is found suitable to replace the vanes by a plate located above the inlet ports and extending inwardly from the inner wall of the intake tube. The plate does not prevent the establishment of a vortex but it does prevent the sucking in of the air by providing only a small clearance between the plate and the shaft of the impeller for the liquid above the plate. The plate should also extend outwardly from the outer wall of the intake tube since the vortex created by the high speed impeller may extend out into the body of liquid outside the tube in the vicinity of the inlet ports.

In a further embodiment it is found especially advantageous to radially introduce the oxygen in a plurality of streams from an annular ring shaped injector mounted adjacent the inlet end of the flow confining chamber which injector has a plurality of spaced apart orifices communicating with a source of oxygen. Injection of the oxygen in this manner increases the number and surface area of bubbles for a given volume of injected oxygen and thus increases the rate of dissolving of the oxygen or the rate of mass transfer. The streams are suitably directed radially inwardly, however, they might also be directed inwardly in a non-radial direction or in a tangential direction.

In another embodiment it is preferred to employ distributor means in the flow confining chamber, for example, one or more horizontally disposed perforated plates or sets of vertically disposed tubes. These distributor means are effective to offset or neutralize the spiral flow and distribute the flow in a generally vertical direction while at the same time increasing the turbulence in the flow confining chamber and improving the gas/liquid contact and thus the efficiency of dissolving the gas. It is further within the scope of the invention to include one or more vertically disposed flow directing plates in the flow confining chamber.

The appearance of bubbles of gas in the flow confining chamber appears at the point where the buoyancy of the gas equals the velocity of downflow of the liquid, at this point a cloud of bubbles is visible. The turbulence in the flow confining chamber produces a continuous shearing, coalescing and reforming of the bubbles, in the cloud and efficient dissolving of the gas.

In a further embodiment the flow confining chamber consists of a cone made up from two parts. The upper conical part with a certain angle of divergence is connected to a lower conical part in which the angle of divergence is greater than that in the upper part. In this way the velocity of downflow of the liquid in the chamber is initially maintained high in the upper half of the chamber and then decreases rapidly in the lower half of the chamber; this increases the turbulence and increases the gas/liquid contact thereby increasing the rate and efficiency of the dissolving of the oxygen. In this way the residence time of the liquid in the oxygen dissolving device, for each circulation, can be increased.

According to another aspect of the invention there is provided a device for dissolving a gas in a body of liquid comprising a flow confining chamber having an inlet end and an outlet end through which a downflow of liquid is conducted with a decreasing velocity from a maximum velocity at the inlet end to a minimum velocity at the outlet end, the walls of said chamber diverging from said inlet end to said outlet end, said flow confining chamber comprising an upper chamber communicating with a lower chamber, the walls of the upper chamber diverging less rapidly than the walls of the lower chamber.

BRIEF DESCRIPTION OF THE DRAWINGS

The invention is illustrated in particular and preferred embodiments by reference to the accompanying drawings in which:

FIG. 2 illustrates schematically a different embodiment of the invention in which an oxygen dissolving device is located outside the vessel, FIG. 4 illustrates a detail of a modified intake tube for the oxygen dissolving device of FIG. 1, FIG. 5 is a section on a line 5—5 of the detail of FIG. 4, FIG. 6 illustrates a detail of another modification of the intake tube for the oxygen dissolving device of FIG. 1, FIG. 7 illustrates schematically a modified flow confining chamber of an oxygen dissolving device having a pinched waist.

DESCRIPTION OF PREFERRED EMBODIMENTS

Figure 1:
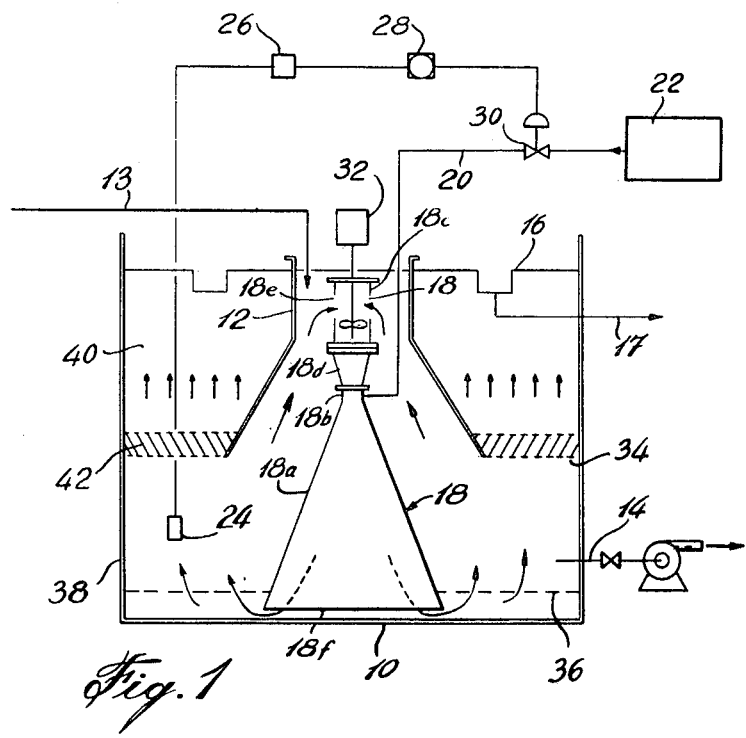
FIG. 1 illustrates schematically an apparatus of the invention for carrying out the process of the invention in which an oxygen dissolving device is located within the vessel.

With further reference to FIG. 1, a treatment apparatus comprises a tank 10 having disposed therein a flow directing baffle 12. An influent line 13 delivers influent to an upper part of the tank 10 within the flow directing baffle 12, and an outlet 14 for solids is provided in the lower part of the tank 10 for removing solids.

In an upper portion of the tank 10 there is provided a clarifier overflow weir 16 which communicates with an effluent line 17 for removing clarified water.

An oxygen dissolving device 18 is mounted in the tank 10 and communicates via an oxygen supply line 20 with an oxygen source 22. An oxygen probe 24 is suspended in the tank 10 and is connected via an oxygen analyzer 26 and a recorder controller 28 to a flow regulating valve 30 in the oxygen supply line 20.

A pump 32 is mounted above the oxygen dissolving device 18 for circulating liquids being treated through the oxygen dissolving device in the direction shown by the arrows. The pump 32 may be, for example, an axial pump or a centrifugal pump; when frothing of the waste water is not a problem and/or when stripping of $CO_2$ from the waste water is deemed desirable, an air-lift pump can be used for the circulation; in this case a certain amount of oxygen from the air-lift is picked up by the mixed liquor, thus reducing the overall oxygen gas requirement.

The tank 10 defines a biological reaction zone 38 and a clarification zone 40 separated by a separating zone 42. The flow directing baffle 12 assists in defining these zones in the tank 10.

A plurality of flow distributing baffles 34 are mounted in the separating zone 42 between the flow directing baffle 12 and the upright walls of the tank 10. The baffles 34 may suitably comprise a plurality of inclined tubular members.

A flow distributor 36 which may suitably comprise a planar member having a plurality of passages therethrough, extends between the upright walls of the tank 10 and the oxygen dissolving device 18 and is disposed in a lower portion of the tank 10 above the outlet of the oxygen contacting device 18.

The oxygen supplying circuit comprising oxygen probe 24 and the related oxygen analyzer 26, recorder controller 28, flow regulating valve 30 and oxygen supply line 20 is of a kind known per se in other technologies where accurate control of oxygen content is necessary. The oxygen supplying circuit controls the supply of oxygen to the waste water treatment so that it meets the demand exerted by the waste water being treated.

In the oxygen supplying circuit the oxygen probe 24 senses the concentration of dissolved oxygen in the biological reaction zone 38; the oxygen probe 24 may be, for example, of the polarographic or galvanic cell type and consists of two different metals immersed in an electrolyte and separated from the waste water in zone 38 by a semipermeable membrane. Under steady state conditions the dissolved oxygen concentration is proportional to the current produced between the two different metals in the cell.

An agitator forms a component part of oxygen probe 24 and continuously pumps liquid in zone 38 across the membrane of the cell. The agitator is suitably fabricated from a soft rubber and is disposed so as to wipe the membrane to keep it free from oil and grease.

The current output from probe 24 as a measure of the dissolved oxygen concentration is analysed by the oxygen analyzer 26 and is amplified into a standard signal range suitable for a standard controller. A recorder controller 28 comprises such a controller in conjunction with a recorder and the recorder controller 28 indicates and records the dissolved oxygen on a continuous basis.

The controller in the recorder controller 28 compares the input signal with a pre-determined set-value and sends a signal to flow regulating valve 30 in the oxygen supply line 20. If the dissolved oxygen is below the set point the valve 30 is signalled to open and vice versa. The set point is determined by experiment in advance by determination of the biological oxygen demand of the waste-water being treated.

The oxygen dissolving device 18 comprises a flow confining chamber 18a having an inlet tube 18b separated from an intake tube 18c by an inverted frusto-conical member 18d. Intake tube 18c includes inlet ports 18e in its side walls. At its lower end the chamber 18a opens at an outlet 18f. The member 18d serves as a connecting piece between the inlet tube 18b and the intake tube 18c which in the particular embodiment are of different diameters.

The flow directing baffle 12 is suitably located substantially centrally in an upper part of tank 10 so as to circumvent an upper part of the oxygen dissolving device 18. In this way the baffle 12 assists in defining the biological reaction zone 38 and the clarification zone 40; in particular an upper portion of zone 38 is defined between the inner wall of baffle 12 and the outer surface of device 18; and the zone 40 is defined between the outer wall of baffle 12 and the inside wall of tank 10. The baffle 12 suitably comprises a tubular member having an upper cylindrical tube and a lower frusto-conical housing, however, baffle 12 may also be a square sectioned member having an upper square sectioned member and a lower square section pyramid.

In operation influent is introduced into the tank 10 via the influent line 13 and is circulated through the oxygen dissolving device 18 and the biological reaction zone 38 by the pump 32. The influent enters device 18 at the inlet ports 18e, leaves at outlet 18f and passes through zone 38 and back to the ports 18e. The velocity of the liquid in chamber 18a decreases as it moves downwardly from the inlet tube 18b to the outlet 18f and the liquid is subjected to turbulence.

Oxygen is introduced to the oxygen dissolving device 18 from the oxygen source 22 via the oxygen supply line 20, and the oxygen dissolves in the liquid passing through the device 18.

The oxygen probe 24 in conjunction with the oxygen analyzer 26 monitors the dissolved oxygen in the biological reaction zone 38 and passes a signal to the recorder controller 28 which interprets the signal and correlates the information concerning the amount of dissolved oxygen of the system, and actuates the flow regulating valve 30 to control the flow of oxygen from the oxygen source 22 to the device 18. The oxygen fed to the device 18 is regulated at the valve 30 under the instruction from the recorder controller 28 to ensure that adequate oxygen is provided to meet the biological oxygen demand of microorganisms in the biological reaction zone 38 while at the same time preventing the introduction of excess oxygen into the biological reaction zone which would be present as undissolved oxygen in the form of bubbles.

As the liquid circulates rapidly through the oxygen dissolving device 18 and biological reaction zone 38, clarified liquid rises slowly upwardly in the clarification zone 40.

The liquid in the biological reaction zone is conveniently circulated for a period of two to three hours, the liquid being present in the oxygen dissolving device 18 for only about 15 seconds in each circulation.

The apparatus illustrated in FIG. 2 differs from that of FIG. 1 in that the oxygen dissolving device is located outside the vessel.

With further reference to FIG. 2, the apparatus represented therein comprises a tank 50 including an influent line 52 to supply influent to a lower part of the tank 50 and a solids outlet 54 in the lower part of the tank 50 for removal of solids.

The tank 50 includes a clarifier overflow weir 56 which communicates with an effluent line 57.

An oxygen dissolving device 58 is located in the influent line 52 for oxygenating the influent being introduced into the tank 50.

The oxygen dissolving device 58 is connected by an oxygen supply line 60 to an oxygen source 62.

The influent line 52 terminates in the tank 50 at an inlet member 53. Inlet member 53 may suitably comprise a tubular member having a plurality of exit passages therein for the influent to flow from the inlet member 53 into the interior of the tank 50. The inlet member 53 may be, for example, an endless tubular frame having the same shape as the cross-section of the tank, for example in the case where the tank 50 is of circular cross-section the inlet member 53 may comprise a circular tubular member, and in the case where the tank 50 is of rectangular cross-section the inlet member may comprise a tubular rectangular frame.

An outlet member 64 is spaced apart from the inlet member 53 and is suitably of similar configuration having a plurality of holes or passages therein for entry of liquid in the tank 50. Outlet member 64 communicates with recirculating line 66 which communicates via pump 68 with the oxygen dissolving device 58.

An oxygen probe 70 is suspended in the tank 50 and is connected via an oxygen analyzer 72 and a recorder controller 74 to a flow regulating valve 76 in the oxygen supply line 60.

There is defined in the tank 50 an upper clarification zone 82 and a lower biological reaction zone 84 separated by a separating zone 86.

The apparatus is constructed so that the oxygen probe 70 and the outlet member 64 are located in the biological reaction zone 84.

As in the embodiment of FIG. 1 it is convenient to employ a plurality of flow distributing baffles 78 in the separating zone 86 in order to enhance the separation. Such baffles 78 conveniently comprise a plurality of inclined tubular baffle members.

In one embodiment the tubes are inclined at an angle of 60° to the base of the tank and comprise a stack of adjacent tubes forming a module, each tube has a generally rectangular, preferably square, cross-section, with a cross-sectional area of about 4 sq. ins.; suitably the tubes are fabricated from a synthetic plastic, for example PVC or ABS. Such modules are commercially available and may be stacked side by side while being firmly supported by clamping members.

Similarly, it is convenient to employ a flow distributor 80 at a lower part of the biological reaction zone 84 and located vertically above the inlet member 53.

In one embodiment a flow distributor (36 or 80) was fabricated from plywood having a thickness of 0.75 inches having about 30% of its total area occupied by circular holes communicating with passages, which holes had diameters of 2 and 3 inches.

The operation of the apparatus illustrated in FIG. 2 is substantially the same as that as described with reference to the apparatus of FIG. 1.

In some cases it may be appropriate to incorporate into the system means for stripping off carbon dioxide. However, carbon dioxide dissolved in the waste water does not affect the performance of the biological treatment when present in moderate quantities, and for treating domestic waste water as opposed to certain industrial waste water stripping of the carbon dioxide is not necessary.

However, the presence of carbon dioxide in the water may reduce the rate and efficiency of the dissolving of oxygen. When it is necessary to improve this efficiency the carbon dioxide may be removed by a simple stripping device. A suitable device functions by contact of the waste water with air, so that the equilibrium conditions favour the transfer of carbon dioxide from water to air. Thus any of several known types of device that contact water with air may be used, for example a surface aerator, submerged turbine or air sparger. The operation of an air sparger as a carbon dioxide stripper is illustrated schematically in FIG. 3.

Figure 3:
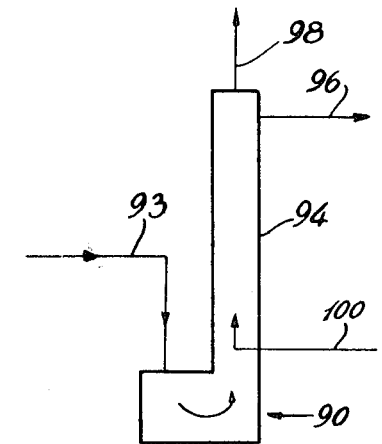
FIG. 3 illustrates schematically a carbon dioxide stripper which may be incorporated in the systems illustrated in FIGS. 1 and 2.

With further reference to FIG. 3 there is illustrated schematically an air sparger 90 comprising a wet well 92 and a vertical column 94; a line 93 is connected to wet well 92 and lines 96 and 98 are connected to column 94; a compressed air line 100 connects column 94 to a source of compressed air (not shown).

The air sparger 90 is disposed in the system illustrated in FIG. 1 or 2 so that a portion of the circulating waste water being treated flows through line 93 to the wet well 92 and travels upwardly through column 94 and back to the circulating waste water in the system via line 96. Compressed air is introduced to the waste water in column 94 via line 100, strips carbon dioxide from the water and excess via line 98.

With reference to FIGS. 4 and 5 there is illustrated a modified intake tube 18c which can be employed in the oxygen dissolving device 18 illustrated in FIG. 1. The intake tube 18c includes inlet ports 18e in its side walls and a pump 32 having an impeller 102 on a centrally disposed shaft 104, the impeller being disposed just below the inlet ports 18e; the intake tube 18c has an upper end 106 which is open to the atmosphere. Extending radially inwardly from the inner wall of intake tube 18c are four vanes 108 which extend vertically above and below inlet ports 18e and terminate at their lower ends just above the impeller 102. The inner edges of vanes 108 are spaced apart from shaft 104 to provide a small clearance.

The intake tube 18c is shown in its working environment in an open body of liquid 110. The vanes 108 prevent the formation of a vortex in the liquid 110 in the tube 18c above the impeller 102, which vortex would suck in air from the atmosphere above the liquid 110.

With reference to FIG. 6 there is illustrated a further modification of the intake tube 18c of an oxygen dissolving device 18 in which the vanes 108 of FIGS. 4 and 5 are replaced by a disc-shaped plate 112 having an inner edge 112a and an outer edge 112b. The plate 112 extends inwardly of the wall of tube 18c so that inner edge 112a is spaced apart from shaft 104 with a small clearance; and the plate 112 extends outwardly of tube 18c so that edge 112b is remote from tube 18c.

The plate 112 does not prevent the formation of a vortex in liquid 110 above impeller 102, however, it does prevent air being drawn from the atmosphere into the liquid by the vortex. The edge 112b should be sufficiently remote from the tube 18c to prevent air being sucked in to a vortex extending out of tube 18c through inlet ports 18e.

In otherwords the parameters of the plate 112 are determined by the vortex which will be produced.

With further reference to FIG. 7 there is shown a modified flow confining chamber 118 adapted to form part of an oxygen dissolving device. The chamber 118 includes an upper conical chamber 120 and a lower frusto-conical chamber 122 mounted on legs 138, the wall of chamber 122 diverging more rapidly than the wall of chamber 120. The chamber 120 is connected to an intake tube 124 via an inlet tube 126 and an inverted frusto-conical connecting member 128. An oxygen injector ring 130 is mounted in the inlet tube 126. Perforated, vertically disposed, flow directing plates 132 and 134 extend between the walls of chamber 120; plate 132 being substantially perpendicular to plate 134 and a disc-shaped perforated flow distributor plate 136 extends horizontally through and is welded to the vertical plates.

The upper conical chamber 120 may suitably define about 30 to 70%, typically about 50% of the total height of chamber 118. The walls of chamber 120 may suitably include an angle of about 10° to about 35°, typically about 25° and the walls of chamber 122 include an angle of about 40° to about 60°, typically about 50°.

Figure 8:
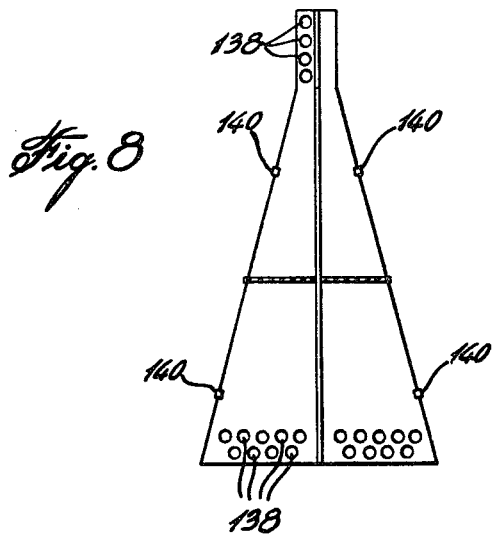
FIG. 8 shows a detail of an assembly of flow directing plates and a distributor plate housed in the flow confining chamber of FIG. 7.

With further reference to FIG. 8 there is shown a detail of the plate assembly 132, 134, 136 of FIG. 7. Each of the vertical plates 132 and 134 and the horizontal plate 136 are perforated with holes 138 over their whole surface; the vertical plates include brackets 140 by means of which they can be mounted inside chamber 120.

The vertically disposed plates 132 and 134 direct the flow of liquid generally downwardly and offset the spiral flow of liquid formed by the impeller. The perforations 138 in the vertical plates 132 and 134 ensure pressure equilization between the quadrants of the chamber 120 formed by the plates 132 and 134 and at the same time the passage of the liquid through the perforations increases the shearing of the liquid and gas thereby increasing the gas/liquid contact. The perforated horizontal plate 136 functions to offset the spiral flow of the liquid and distributes the liquid in a downward direction, while producing a shearing action similar to that of the vertical plates 132 and 134.

The perforations 138 in plates 132, 134 and 136 are suitably circular having a diameter of about 1 to 3 inches typically about 2 inches and may suitably occupy about 30 to 70%, typically about 50% of the plate area.

An assembly similar to that of FIG. 8 can be employed in the oxygen dissolving device 18 of FIG. 1; further there can be employed solely the vertical flow directing plates 132 and 134 or solely the horizontal flow distributing plate 136 or a plurality of plates 136 spaced vertically apart.

In one especially preferred embodiment employing an oxygen dissolving device 18 of FIG. 1, there was employed two horizontal, perforated flow distributing plates 136, a lower plate being located at half the vertical height of flow confining chamber 18a and an upper plate located at one-third the vertical height of chamber 18a measured from the upper end.

Figure 9:
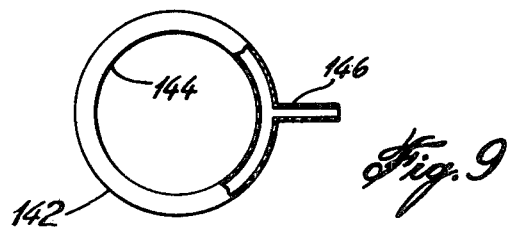
FIG. 9 illustrates an oxygen injector ring shown in the device of FIG. 7.
Figure 10:
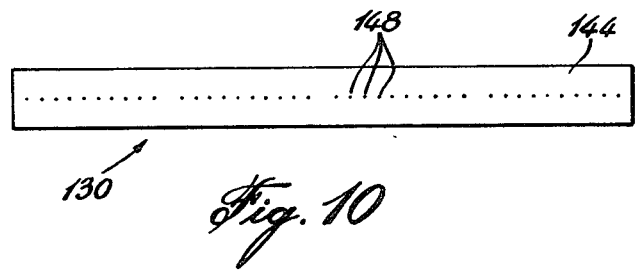
FIG. 10 illustrates a detail of the ring of FIG. 9 showing the gas outlets.

With further reference to FIGS. 9 and 10 there is illustrated an oxygen injector ring 142 having an inwardly facing surface 144 and an oxygen inlet pipe 146. The inwardly facing surface 144 has a plurality of holes 148 therein, as shown in FIG. 10. In one particular embodiment there were 40 holes 148 in surface 144, located in four groups of 10, each hole 148 being located on a common circumferential line. The holes 148 which suitably have a diameter of 1/32 inches provide an efficient injection of oxygen and increase the rate of dissolving of the oxygen.

Figure 11:
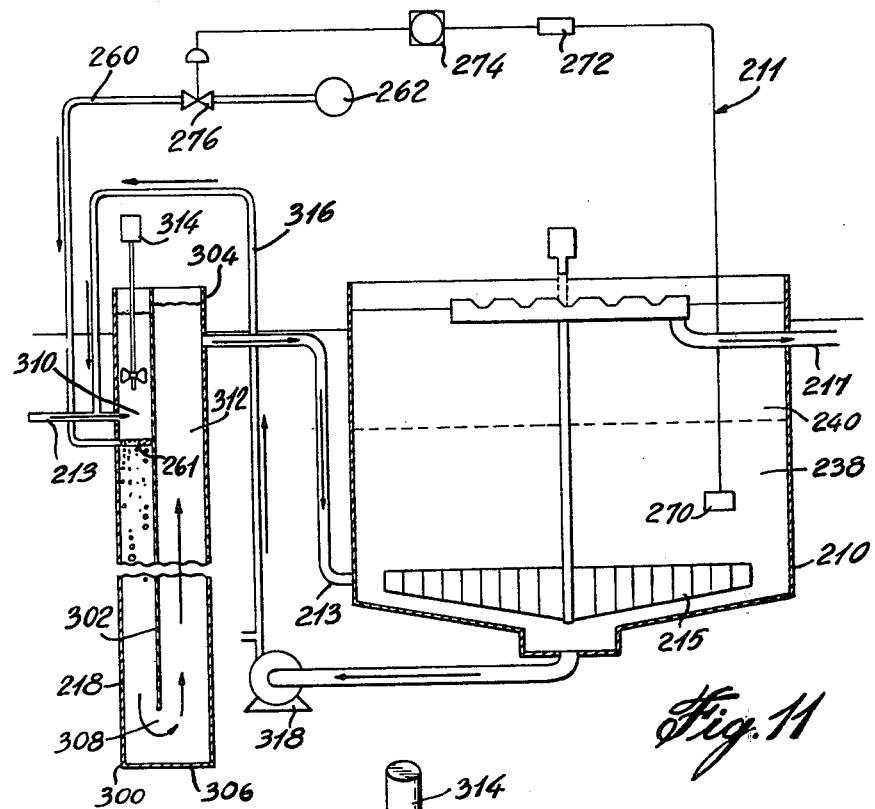
FIG. 11 illustrates schematically another embodiment of the invention in which an oxygen dissolving device is located outside the vessel.

With reference to FIG. 11 there is shown a treatment apparatus which is similar to that of FIG. 2, inasmuch as the oxygen dissolving device is located outside the tank.

In FIG. 11 the treatment apparatus comprises a tank 210, an oxygen dissolving device 218 located outside the tank 210 and a controlled oxygen supply system 211.

The tank 210 includes an influent line 213, an effluent line 217 and a solids outlet 214.

An overflow weir 216 is located in an upper portion of tank 210 and is in communication with effluent line 217 for removing clarified water; and a rotatable sludge rake 215 is disposed in a lower portion of tank 210.

The tank 210 provides for a lower biological reaction zone 238 and an upper clarification zone 240.

Figure 12:
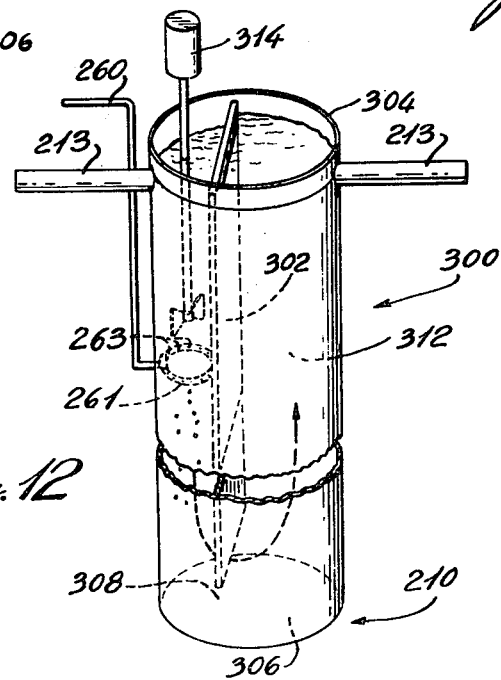
FIG. 12 illustrates in greater detail the oxygen dissolving device employed in FIG. 11.

The oxygen dissolving device 218 illustrated by reference to FIGS. 11 and 12 is located in the influent line 213.

The device 218 comprises a generally cylindrical tube 300 having a partition wall or baffle 302 extending between the walls of the tube 300 from an upper end 304 of tube 300 towards a lower end 306, a gap 308 being provided between wall 302 and end 306; the partition wall 302 dividing the tube 300 into an upstream portion 310 and a downstream portion 312.

A recirculation impeller 314 is disposed near the top of the upstream portion 310.

A recirculation line 316 in which is disposed a pump 318 communicates the biological reaction zone 238 in tank 210 with influent line 213 upstream of tube 300.

The oxygen dissolving device 218 is connected by an oxygen supply line 260 to an oxygen source 262.

An oxygen probe 270 is suspended in the biological reaction zone 238 in tank 210 and is connected via an oxygen analyzer 272 and a recorder controller 274 to a flow regulating valve 276 in the oxygen supply line 260.

As shown more clearly in FIG. 12, the oxygen supply line 260 terminates in upstream portion 310 in an oxygen injector 261 comprising an injector ring 263 having an array of holes therein.

The operation of the apparatus illustrated in FIGS. 11 and 12 is substantially the same as that described with reference to FIGS. 1 and 2.

Influent is introduced into tank 210 via influent line 213 and oxygen dissolving device 218, and is recirculated through the biological reaction zone 238 and device 218 by pump 318.

Oxygen is introduced to upstream portion 310 of device 218 and is entrained in the liquid passing to the downstream portion 312 and from there to biological reaction zone 238.

The oxygen content is monitored and controlled in the same manner as described with reference to FIG. 1.

As the liquid circulates rapidly through biological reaction zone 238 and device 218, clarified liquid rises slowly upwardly in the clarification zone 240.

The zones 238 and 240 may optionally be separated by a separating zone and flow distributing baffles such as are described with reference to FIG. 1 (42 and 34).

Figure 13:
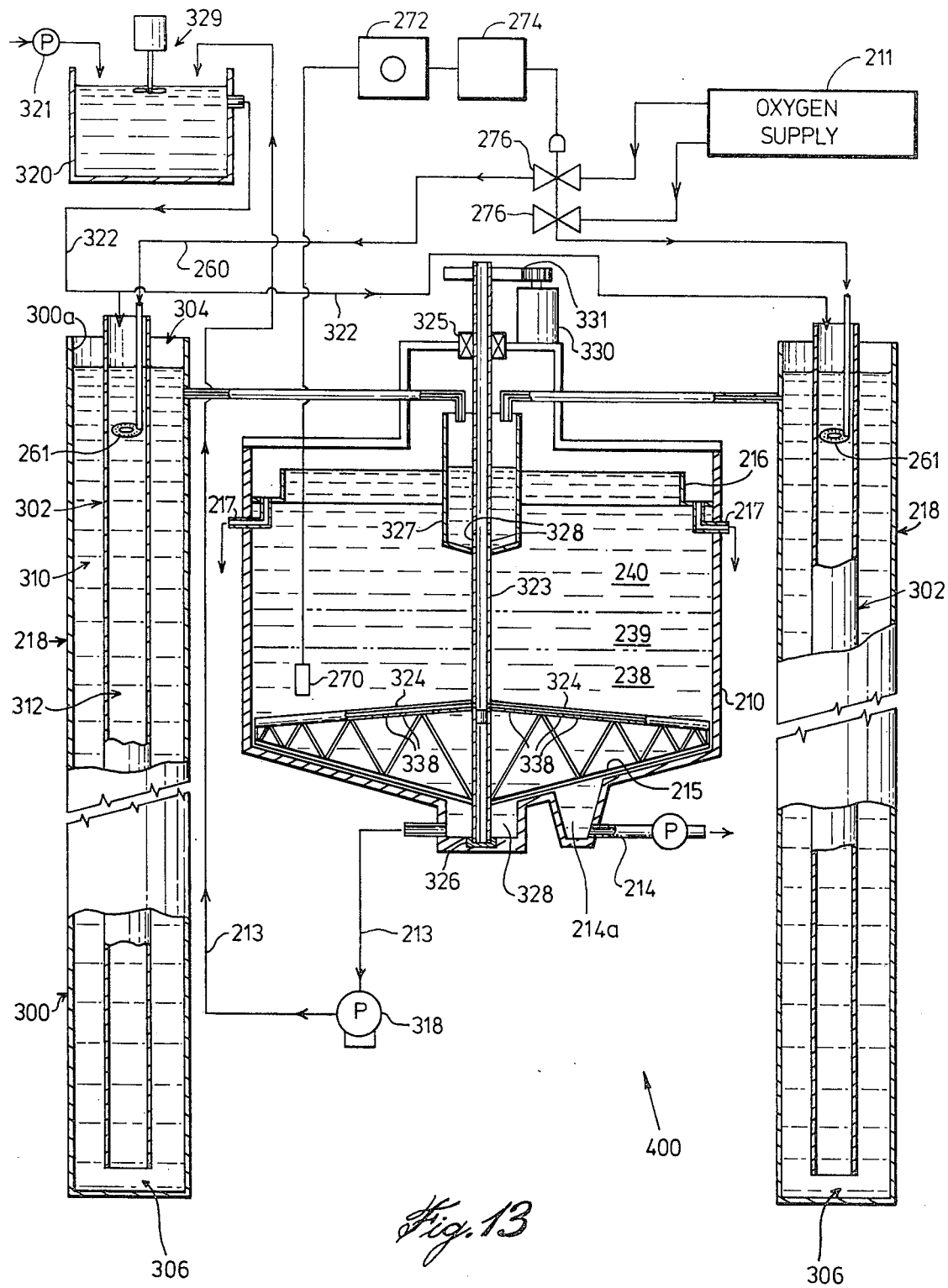
FIG. 13 illustrates schematically a variant of the embodiment of FIG. 11, employing two oxygen dissolving devices.

With further reference to FIG. 13 there is shown a treatment apparatus 400. This comprises a tank 210 with an open top so the surface is accessible to the atmosphere, oxygen dissolving devices, in this case U-tubes 218, located outside the tank and a controlled oxygen supply system 211.

The tank 210 includes recycle lines 213, effluent lines 217 and a solids outlet 214.

An overflow weir 216 is located at the upper part of the tank 210 and leads to the effluent lines 217 for removing clarified water. A rotating sludge rake 215 is disposed in a lower part of the tank 210. One function of the rake 215 is to prevent solids from stagnating at the bottom part of the tank 210.

The tank 210 provides for a lower biological reaction zone 238 and an upper clarification zone 240 with an intervening transition zone 239 which are maintained as will be described.

The U-tubes 218 are different from the device 218 in FIGS. 11 and 12 and are connected to the recycle lines 213.

Each U-tube 218 is made up of a vertical elongated tube or shaft 300, lined with a cylindrical tube 300a, having an inner concentric tube 302 extending from the upper end 304 of the shaft 300 and terminating near its lower end 306. A space 308 is provided between the bottom end of the tube 302 and the end 306. The tubes 300 and 302 thus provide a downflow channel 312 and a concentric upflow channel 310.

The flow to the downflow channels 312 is provided through a line 322 leading from a head tank 320. The tank 320 is supplied with incoming waste water (influent) from a pump 321. The downward flow in the channel 312 may be induced by elevating the tank 320 or other means as will be described.

The recycle line 213, in which is disposed a pump 318, leads from a well 328 in the bottom of the biological reaction zone 238 to the head tank 320. A solids outlet 214 leads from a solids collection well 214a, in the foot of the vessel 210, to facilitate the removal of excess sludge.

Each oxygen dissolving device 218 is connected by an oxygen supply line 260 to the oxygen source 211 through flow regulating valves 276.

A dissolved oxygen probe 270 is suspended in the biological reaction zone 238 in the tank 210 and is connected via an oxygen analyzer 272 and a recorder-controller 274 to the flow regulating valves 276 in the oxygen supply line 260.

The oxygen supply line 260 is connected to an oxygen injector 261 located in the upper part of the downflow channel 312. The oxygen injector 261 in the embodiment shown is in the form of a ring having an array of holes in it so that the oxygen is injected in the form of small bubbles to facilitate its dissolving in the liquid (see FIG. 5).

The operation of the process is as follows.

Influent is introduced into the head tank 320 via the line 321 where it is combined with recycled mixed liquor in the line 213 coming from the reaction zone 238. A mixture of incoming waste liquor and recycled partly treated mixed liquor is passed from the tank 320 through the line 322 into the downflow channel 312 of the U-tubes 218. The resulting mixture of oxygen and liquid passes through the downflow channel 312 and then through the upflow channel 310 so that the oxygen is dissolved in the liquid.

The dissolved oxygen concentration in the biological reaction zone 238 is monitored continually by the device 270. The oxygen feed is adjusted according to the variations in the oxygen concentration (oxygen demand) through the instruments 272, 274 and the valve 276 to maintain the oxygen concentration in the biological reaction zone within predetermined desired limits.

As the liquid circulates in the biological reaction zone 238 and through the U-tubes 218, clarified liquid rises quiescently in the clarification zone 240 and overflows the weirs 216 and is carried away through the pipes 217.

Between the zones 238 and 240 is the transition zone 239 in which solids separate from the liquid and settle into the biological reaction zone 238.

In the biological reaction zone 238 carbon dioxide will be generated. This may conveniently be removed from the feed tank 320 by a conventional surface aerator 329 or other device. Alternatively, the carbon dioxide may be removed at other places in the system.

In the embodiment of the invention shown in FIG. 13, the sludge rake 215 is mounted on the lower end of a hollow shaft 323 which is journalled in upper and lower bearings 325 and 326, respectively, suitably mounted on the tank. Surrounding the shaft 323 above the tank 210 is a collection reservoir 327 which communicates with the inside of the shaft 323 through openings 328. The rake 215 includes outwardly extending pipes 324, communicating with the inside of the shaft 323. The pipes 324 have outlet openings or nozzles 338. The shaft 323 is rotated by an electric motor 330 through a reduction gear system 331.

In accordance with the invention, for the effective treatment of the waste water, a number of interdependent factors are controlled, for example:

Waste water will be received by the system at a variable rate. The flow rate of the influent to the system is related to the depth and surface area of the treatment enclosure to provide a residence time within the reaction zone effective for the biodegradation of the waste and for the biological floc to settle. This is built into the design of the vessel 210.

The recycle stream of mixed liquor is controlled to a constant rate effective to provide for dissolving the oxygen added to the recycle stream at a variable rate, and for an amount of dilution of the recycle stream entering the reaction zone effective to prevent the oxygen coming out of solution at the top of the reaction zone.

The rate, direction and type of flow of the incoming recycle stream to the biological reaction zone is controlled to provide controlled agitation effective to keep the solids dispersed and to provide, at an intermediate level of the enclosure, an upward velocity of the mixed liquor less than the settling rate of the solids so that there is maintained in the enclosure separate reaction and clarification zones, intervened by a transition zone.

The concentration of dissolved oxygen in the reaction zone is monitored constantly to determine variations thereof. The rate of flow of the oxygen to the recycle stream is adjusted, in response to the variations in the concentration of dissolved oxygen in the reaction zone, so as to restore the concentration of oxygen in the reaction zone to within a selected range effective to biodegrade the waste solids and to maintain the oxygen in solution so as to avoid effervescence that would lead to gas bubbles rising to the surface and entraining solids.

The invention has been explained by reference to the preferred apparatus shown in FIG. 13. It will be understood that this apparatus may be varied considerably and still perform the functions described and provide for effective control of the interdependent factors necessary to operate under practical conditions. A head tank 330 is shown in FIG. 13 to which influent waste and partially oxygenated mixed liquor is pumped using an airlift, centrifugal, positive displacement, or axial flow pump. A centrifugal, axial flow, or positive displacement pump can be employed to pump down the U-tube 218. A centrifugal, axial flow, positive displacement or airlift pump can be employed to draw flow from the U-tube up flow channel 310.

A centrifugal, axial flow, positive displacement or airlift pump may be employed to draw from a sump in the bottom of the tank 210. The returning flow from the biological reactor zone 238 to the U-tube 218 may be induced by using a centrifugal, axial flow, positive displacement or airlift pump to draw from a sump in the bottom of the tank or through nozzles attached to the sludge rake 215 or drawing through nozzles attached to a piping header laid on the bottom of the tank 210.

Flow distribution in the tank 210 can be achieved by sludge rake 215 which comprises a rotating rake and scraper with flow nozzles 325 installed close to the top of the rake 215, as shown, or by introducing flow at the periphery of the tank 210.

The total surface area of the flow nozzles 325 is suitably at least equal to the cross-sectional area of the inside of shaft 323. Conveniently the apparatus may include a second rake 215 which may conveniently be angularly offset 90° to the first rake 215, while lying in the same horizontal plane.

Effluent overflow may be achieved by collection of flow around the periphery or from the center or a midpoint of the tank 210.

Excess sludge may be removed from the tank 210 by an external batch operated decantation tank, an external continuously operated decantation tank, or by a decantation basin in the bottom of the tank 210.

Addition of oxygen to the U-tubes 218 may be by the use of a single tube or a multiplicity of tubes, by a porous diffuser, or by an orifice plate or venturi injector.

Carbon dioxide stripping may be accomplished by a submerged aerator in the head tank, by sparging-in air at the head tank 320 or U-tube 218, or by a second U-tube.

The tank 210 may be of various configurations, for example, cylindrical, square or rectangular.

EXAMPLE 1

A pilot plant was set up in the laboratory according to that illustrated in FIG. 2 of the drawings in which the oxygen contacting device was located outside the tank. The waste water treated was synthetic and was made from a solution of glucose and added nutrients. The plant was operated under the following condition.

| Waste Water | |
|---|---|
| Flow | 4,800 G.P.D. |
| | (gallons/day) |
| Quality | |
| Total biological oxygen demand (BOD) 264 mg/l (milligrams/liter) | |
| Total chemical oxygen demand (COD) | 396 mg/l |
| Process Conditions | |
| Biological Reaction Zone | |
| Mixed liquor suspended solids (MLSS) | 26,000 mg/l |
| Temperature | 19° C. |
| Dissolved Oxygen (D.O.) | 5 mg/l |
| Residence time | 1.5 hours |
| Clarification Zone | |
| Overflow rate | 383 g./d./sq.ft. |
| | (equivalent to |
| | 4,800 G.P.D.) |
| Effluent Quality | |
| Suspended solids | 85 mg/l |
| Total BOD | 95 mg/l |
| Total COD | 200 mg/l |

Although, in this example, the effluent quality was not too good, the principle of the two zone process was found to be practical. The wasting of sludge, was determined by the level of the mixed liquor in the biological reactor. In this example, the MLSS was 26,000 mg/l. The mixed liquor in this process was also the sludge which was wasted.

EXAMPLE 2

The following represent typical performance data obtained with municipal waste water biologically treated with the two zone process. An apparatus as illustrated in FIG. 1 was employed having the oxygen contacting device in the tank, but without the flow of distributor 36 and without the flow distributing baffles 34.

| Waste Water | | |
|---|---|---|
| Flow | Min. | 50,000 G.P.D. |
| | Max. | 110,000 G.P.D. |
| | Average | 75,000 G. P.D. |
| Quality | | |
| Suspended Solids | | 70 mg/l |
| Total BOD | | 125 mg/l |
| Soluble BOD | | 60 mg/l |
| Total COD | | 250 mg/l |
| Soluble COD | | 175 mg/l |
| Process Conditions | | |
| Biological Reaction Zone | | |
| M.L.S.S. | | 2500 mg/l |

-continued

| | |
|---|---|
| Temperature | 16° C. |
| Dissolved Oxygen | 3 mg/l |
| Residence Time | 3-4 hours |
| Clarifier | |
| Overflow rate | 1000 G.P.D./sq.ft. |
| Sludge (Solids) Settling Velocity | 7 ft./hour |
| Effluent Quality | |
| Suspended Solids | 20 mg/l |
| Total BOD | 25 mg/l |
| Soluble BOD | 5 mg/l |
| Total COD | 80 mg/l |
| Soluble COD | 55 mg/l. |

EXAMPLE 3

The following represent typical performance data and parameters obtained with municipal waste water biologically treated with the apparatus of FIG. 13:
(a) Characteristics of waste water to be treated:
The flow of waste water and its quality as defined by B.O.D., C.O.D., suspended solids, pH, were determined in a preliminary study. The results of these were as follows:
 (i) B.O.D. <300 mg/l for 95% of time
 (ii) C.O.D. <600 mg/l for 95% of time
 (iii) Suspended solids <300 mg/l for 95% of time
 (iv) Flow rate <700 g.p.m. for 90% of time i.e. 1,000,000 g.p. day.
(b) Effluent quality required from process:
 (i) B.O.D. 20 mg/l
 (ii) C.O.D. 100 mg/l
 (iii) Suspended solids 20 mg/l
(c) In a trial study in the laboratory it was determined that to reduce the B.O.D. from 300 mg/l to 20 mg/l, the residence time required in the biological reaction zone 238 was 3 hours.
(d) Volume of biological reaction zone
$238 = (1,000,000/24) \times 3$
$= 125,000$ Gallons
$= 20,032$ ft.$^3$
(e) In a trial study in the laboratory it was determined that the overflow rate required to obtain an effluent quality with suspended solids of 20 mg/l was 500 g.p.d./ft.$^2$.
(f) Hence the overflow area required
$(1,000,000/500) = 2,000$ ft.$^2$
Assuming a circular tank 210 is chosen the diameter = d feet
$(\pi d^2/4) = 2,000$
$d \sim 50$ feet
For a residence time in the clarification zone 240 of 4 hours, the depth of the zone 240 is determined:

$$\text{Depth of zone 240} = \frac{1,000,000 \times 4}{24 \times 6.24 \times 2000} = 13.36 \text{ ft.}$$

The volume of the biological reaction zone 238 is 20,032 ft.$^3$ and so the depth of the biological reaction zone is 10 ft.
(g) Size of U-tube 218:
Oxygen demand of the waste water is:
$1,000,000 \times 10 \times 300 = 3,000$ lbs./day.
For a U-tube 100 feet deep, the oxygen added per circulation = 40 mg/l, i.e. $\Delta DO = 40$ mg/l.
Consequently the total recirculated flow to dissolve 3,000 lbs./day is:

$$\frac{3,000}{40} \times 100,000 = 7.5 \text{ m.g.d.}$$
$$= 5208 \text{ g.p.m.}$$

Considering a velocity in the downflow channel 312 of 5 feet/sec.; the appropriate diameter of tube 302 to give this velocity at a flow of 5208 g.p.m. is about 24".
The diameter of concentric tube 300 or of shaft 300 to provide about the same annular area is 36".
(h) Size of head tank 320:
Assuming a total residence time in the head tank 320 of 10 minutes:

| Influent flow | = | 700 g.p.m. |
|---|---|---|
| Recirculation flow | = | 5,208 g.p.m. |
| Total flow | = | 5,908 g.p.m. |

There the volume of head tank

| |
|---|
| $320 = 59,080$ gals. |
| $= 9,468$ ft.$^3$ | i.e. a tank 320 having, for example the diameter $20' \times 20' \times 24'$
Thus in summary the tank 210 in FIG. 13 suitably has a diameter of 50 feet and a depth of 23.4 feet.
10 feet depth for biological reaction zone 238
13.4 feet depth for clarification zone 240 p The volumetric size of U-tube 218:
24 in. diameter for internal pipe 302
36 in. diameter for external pipe 300a
Depth of pipes 302 and 300a is about 150 feet.
Recycled flow rate = 5,208 g.p.m.
Size of head tank 20 ft. wide × 20 ft. long × 24 ft. deep.

We claim:
1. An apparatus for treating waste water containing biodegradeable waste to provide a clarified liquid effluent and a disposable sludge including a single treating enclosure open to the atmosphere for containing waste-degrading microorganisms and through which waste water is continuously passed, and to which oxygen is added to sustain the microorganisms and from which the clarified effluent is continuously overflowed and from which excess sludge and gases are removed, in which a lower part of the enclosure defines a biological reaction zone for containing mixed liquor containing said microorganisms and in which a biological reaction to degrade the waste is conducted, an upper part of the enclosure defines a clarification zone in which clarified liquid rises and overflows, and there is between the reaction and clarification zones a transition zone to effect rising of the liquid of the mixed liquor and settling of the solids,
 an oxygen-dissolving device,
 means for continuously withdrawing a recycle stream of mixed liquor from the reaction zone and conducting the stream through said oxygen-dissolving device,
 means for continuously adding influent waste water to said stream,
 means including a source of oxygen for continuously adding oxygen to the oxygen-dissolving device to dissolve oxygen in the stream, and means for passing the thusly supplemented recycled stream into a lower part of the reaction zone of the enclosure remote from the vicinity of withdrawal, means for continuously conducting the waste water into the recycle stream at a variable rate within a range related to the depth and surface area of the enclosure to provide a residence time within the reaction zone effective for the biodegradation of the waste and for the formation and settling of biological floc, means for continuously adding oxygen to said recycle stream at a rate to provide an oxygen concentration within a controlled range below the saturation level of oxygen in the liquid effective to meet the oxygen demand of the organisms and to maintain it in contact with the liquid in a contact zone of said stream for a time and under a pressure such that the oxygen is dissolved in the liquid, means for continuously controlling the overall flow rate of said recycle stream to a substantially constant rate several times that of the influent waste water effective to provide for dissolving the oxygen which is added to the recycle stream, and an amount of dilution of the recycle stream entering the reaction zone effective to prevent the oxygen coming out of solution at an upper part of the reaction zone, means for continuously distributing the flow of said recycle stream entering the reaction zone to reach a substantial area of a lower part thereof to provide a wide spread direct flow through the reaction zone, from the vicinity of injection to the vicinity of withdrawal, whereby there is controlled agitation effective to keep the solids dispersed, and good access of the organisms to the biodegradeable waste, and to provide at an intermediate level of the enclosure, an upward velocity of the mixed liquor less than the settling rate of the solids, whereby there is maintained in the enclosure separate reaction and clarification zones intervened by said transition zone, means for continuously monitoring the concentration of dissolved oxygen in the reaction zone to determine variations thereof resulting from variations in the flow rate and concentration therein of waste including a probe located within said reaction zone, means including a dissolved oxygen analyzer and controller responsive to the probe, for periodically adjusting the rate of addition of the oxygen to the recycle stream in response to variations in the oxygen concentration in the reaction zone to maintain said concentration within said controlled range and at a level where there is substantially avoided effervescence that would lead to gas bubbles rising into the clarification zone, means for continuously withdrawing said effluent from the clarification zone to keep pace with the influent waste water, and means for continually removing excess sludge from the reaction zone and carbon dioxide from the mixed liquor.

2. An apparatus, as defined in claim 1, in which the agitation is provided by means subdividing the stream into jets arranged across the container.

3. An apparatus, as defined in claim 1, in which the oxygen-dissolving device is a chamber of tapering cross-section within the enclosure below the liquid level and having an entrance at its narrow end towards the top of the enclosure and an outlet at its wide end towards the bottom of the enclosure.

4. An apparatus, as defined in claim 1, in which the oxygen-dissolving device includes an elongated cooperating downcomer for receiving the supplemented recycle stream and an upcomer leading back to the enclosure.

5. An apparatus, as defined in claim 1, wherein the means for distributing the flow of the supplemented recycle stream includes,
- a rotatable hollow shaft mounted centrally for rotation in said enclosure and providing a vertical conduit,
- a distributing conduit extending outwardly from a lower part of the shaft and having an operable connection with the vertical conduit,
- said distributing conduit being provided with a plurality of outlets for directing said influent recycle stream in predetermined directions to provide said controlled agitation.

6. An apparatus, as defined in claim 5, in which the distributing conduit is part of a foot including raking means for removing solids from the bottom of the enclosure.

7. An apparatus as defined in claim 6, in which the means for distributing the flow of the influent recycle stream includes means for conducting the stream to a lower part of the container and means connected therewith for distributing the stream so conducted in jets at positions across the container.

8. An apparatus, as defined in claim 7, in which the distributing conduit and the raking means are part of a foot in which the distributing conduit extends outwardly from the central shaft at a downward angle and forms a top beam, the raking member extends outwardly from the central shaft at an upward angle and is spaced from the outwardly extending conduit, and there are connecting members extending between the conduit and the raking member so that the entire unit is substantially in the form of a truss.

9. An apparatus, according to claim 1, wherein said oxygen-dissolving-device is defined by at least one vertical column having an elongated downflow channel and an elongated upflow channel, said means for introducing oxygen being adapted to inject oxygen into said downflow channel; said means for conducting influent waste water to said oxygen-dissolving-device comprising first conduit means communicating said reaction zone with an upper end of said downflow channel for passage of liquid from said reaction zone to said downflow channel; and second conduit means communicating said reaction zone with an upper end of said upflow channel for passage of liquid from said upper end to said reaction zone.

* * * * *